United States Patent
Kanae et al.

(10) Patent No.: US 6,670,426 B2
(45) Date of Patent: Dec. 30, 2003

(54) OLEFINIC THERMOPLASTIC ELASTOMER, PROCESS FOR PRODUCTION THEREOF, OLEFINIC THERMOPLASTIC ELASTOMER COMPOSITIONS, PROCESS FOR PRODUCING THE SAME, AND MOLDINGS THEREOF

(75) Inventors: Kentarou Kanae, Tokyo (JP); Akihiko Morikawa, Tokyo (JP); Hideo Nakanishi, Tokyo (JP); Shoei Tsuji, Tokyo (JP)

(73) Assignee: JSR Corporation, Tokyo (JP)

( * ) Notice: Subject to any disclaimer, the term of this patent is extended or adjusted under 35 U.S.C. 154(b) by 0 days.

(21) Appl. No.: 10/343,834

(22) PCT Filed: Jun. 26, 2002

(86) PCT No.: PCT/JP02/06404

§ 371 (c)(1),
(2), (4) Date: Feb. 10, 2003

(87) PCT Pub. No.: WO03/002657

PCT Pub. Date: Jan. 9, 2003

(65) Prior Publication Data

US 2003/0158347 A1 Aug. 21, 2003

(30) Foreign Application Priority Data

Jun. 28, 2001 (JP) ........................................ 2001-195928

(51) Int. Cl.⁷ .......................... C08F 8/42; C08F 232/04; C08F 232/08
(52) U.S. Cl. .................... 525/329.5; 525/196; 525/211; 525/212; 525/221; 525/231; 525/328.5; 525/328.8; 525/328.9; 525/331.7; 525/367; 525/368; 525/369; 525/372; 525/373; 524/547; 524/554; 524/556; 524/562

(58) Field of Search ................................. 525/196, 211, 525/212, 221, 231, 328.5, 328.8, 328.9, 329.5, 331.7, 367, 368, 369, 372, 373; 524/547, 554, 556, 562

(56) References Cited

U.S. PATENT DOCUMENTS 4,968,752 A * 11/1990 Kawamoto et al. .......... 525/194
5,338,610 A * 8/1994 Sullivan ...................... 428/407

FOREIGN PATENT DOCUMENTS

| EP | 1 113 027 | 7/2001 |
| JP | 10-130435 | 5/1998 |
| JP | 10-330429 | 12/1998 |
| JP | 2001-181349 | 7/2001 |
| JP | 2002-53712 | 2/2002 |
| JP | 2002-97318 | 4/2002 |

* cited by examiner

*Primary Examiner*—Fred Teskin
(74) *Attorney, Agent, or Firm*—Oblon, Spivak, McClelland, Maier & Neustadt, P.C.

(57) ABSTRACT

An olefin thermoplastic elastomer containing an olefin random copolymer formed by copolymerizing ethylene, an α-olefin having 3 to 10 carbon atoms and an unsaturated monomer having a functional group, and optionally a non-conjugated diene, and metal ions crosslinking the olefin random copolymer, has the same or similar rubber elasticity, flexibility and molding and processability as the conventional olefin thermoplastic elastomers, and has good mechanical properties, wear resistance, in particular scratch resistance.

12 Claims, No Drawings

OLEFINIC THERMOPLASTIC ELASTOMER, PROCESS FOR PRODUCTION THEREOF, OLEFINIC THERMOPLASTIC ELASTOMER COMPOSITIONS, PROCESS FOR PRODUCING THE SAME, AND MOLDINGS THEREOF

TECHNICAL FIELD

The present invention relates to an olefin thermoplastic elastomer and a production process thereof, an olefin thermoplastic elastomer composition and a production process thereof, and molded products, and more particularly to an olefin thermoplastic elastomer excellent in rubber elasticity, flexibility, mechanical properties, scratch resistance, wear resistance, molding or forming and processability, heat resistance and weather resistance and a production process thereof, an olefin thermoplastic elastomer composition and a production process thereof, and molded or formed products.

BACKGROUND ART

Those obtained by mixing an olefin resin with an olefin copolymer rubber, those obtained by partially crosslinking an olefin resin and an olefin copolymer rubber with a crosslinking agent, etc. have heretofore been known as olefin thermoplastic elastomers. Such olefin thermoplastic elastomers attract attention, in fields of automotive parts and the like in particular, as substitutive materials for metal parts with the main purpose of lightening the weight, substitutive materials for RIM urethane parts with the main purpose of improving part's life and reducing cost, substitutive materials for vulcanized rubber with the main purpose of simplifying processing steps, improving recycling ability and reducing cost, substitutive materials for soft polyvinyl chloride with the main purpose of improving part's life and protecting a global environment, or the like because they are excellent in heat resistance, weather resistance, cold resistance and molding or forming and processability and comparatively cheap materials, and demand for the olefin thermoplastic elastomers increase year by year.

Since the conventional olefin thermoplastic elastomers are low in resistance to surface scratching (scratch resistance), however, the elastomers involve a problem that they are unsuitable for use as surface materials for molded or formed products of which the scratch resistance is required, for example, inner panels, console boxes or the like.

DISCLOSURE OF THE INVENTION

The present invention has been made on the basis of the foregoing circumstances and has as its object the provision of an olefin thermoplastic elastomer having the same or similar rubber elasticity, flexibility and molding or forming and processability as those of the conventional olefin thermoplastic elastomers, and are good in mechanical properties and wear resistance and excellent in scratch resistance in particular and a production process thereof, a composition containing the olefin thermoplastic elastomer and a production process thereof, and molded or formed products thereof.

According to the present invention, there is thus provided an olefin thermoplastic elastomer comprising an olefin random copolymer formed by copolymerizing ethylene, an α-olefin having 3 to 10 carbon atoms and an unsaturated monomer having a functional group, and optionally a non-conjugated diene, and metal ions crosslinking the olefin random copolymer.

In the olefin thermoplastic elastomer according to the present invention, the functional group in the unsaturated monomer having a functional group may preferably be a carboxyl group, hydroxyl group, epoxy group or sulfonic group.

In the olefin thermoplastic elastomer according to the present invention, the unsaturated monomer having a functional group may preferably be a functional cyclic compound represented by the following general formula (1):

General formula (1):

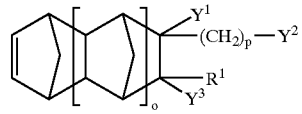

wherein $R^1$ means a hydrogen atom or a hydrocarbon group having 1 to 10 carbon atoms, $Y^1$, $Y^2$ and $Y^3$ denote, independently of one another, a hydrogen atom, a hydrocarbon group having 1 to 10 carbon atoms or —COOH, with the proviso that at least one of $Y^1$, $Y^2$ and $Y^3$ is —COOH, and when at least two of $Y^1$, $Y^2$ and $Y^3$ are —COOH, they may be bonded to each other to form an acid anhydride (—CO—(O)—CO—), o is an integer of 0 to 2, and p is an integer of 0 to 5.

In the olefin thermoplastic elastomer according to the present invention, the olefin random copolymer may preferably be formed by copolymerizing 35 to 94.99 mol % of ethylene, 5 to 50 mol % of the α-olefin having 3 to 10 carbon atoms, 0.01 to 5 mol % of the functional cyclic compound represented by the general formula (1) and 0 to 10 mol % of the non-conjugated diene.

In the olefin thermoplastic elastomer according to the present invention, the metal ions may preferably be ions of a metal selected from the group consisting of potassium, sodium, aluminum, magnesium, barium, zinc, iron, calcium, titanium and lead.

The olefin thermoplastic elastomer according to the present invention may preferably have a melt flow rate of at least 0.5 g/10 min as measured under conditions of a temperature of 230° C. and a load of 10 kg, a permanent set of at most 30% and a durometer A hardness of at most 96.

According to the present invention, there is also provided a process for producing an olefin thermoplastic elastomer, which comprises the step of mixing a solution with 100 parts by weight of an olefin random copolymer formed by copolymerizing 35 to 94.99 mol % of ethylene, 5 to 50 mol % of an α-olefin having 3 to 10 carbon atoms, 0.01 to 5 mol % of a functional cyclic compound represented by the general formula (1) and 0 to 10 mol % of a non-conjugated diene dissolved in a solvent with a liquid with 0.1 to 20 parts by weight of a metal compound dissolved or dispersed in a solvent, at a temperature of at least 20° C. and the step of removing the solvent(s) from the resultant liquid mixture.

According to the present invention, there is further provided a process for producing an olefin thermoplastic elastomer, which comprises the step of subjecting 100 parts by weight of an olefin random copolymer formed by copolymerizing 35 to 94.99 mol % of ethylene, 5 to 50 mol % of an α-olefin having 3 to 10 carbon atoms, 0.01 to 5 mol % of a functional cyclic compound represented by the general formula (1) and 0 to 10 mol % of a non-conjugated diene and 0.1 to 20 parts by weight of a metal compound to a dynamic heat treatment under conditions of a temperature of 120 to 350° C. and a shear rate of 10 to 2,000 s$^{-1}$.

According to the present invention, there is still further provided an olefin thermoplastic elastomer composition comprising the olefin thermoplastic elastomer described above, and a polymeric compound selected from a thermoplastic resin and rubber and/or a softening agent, wherein
the polymeric compound and the softening agent are contained in proportions of at most 300 parts by weight and at most 100 parts by weight, respectively, per 100 parts by weight of the olefin random copolymer forming the olefin thermoplastic elastomer.

The olefin thermoplastic elastomer composition according to the present invention may preferably have a melt flow rate of at least 0.5 g/10 min as measured under conditions of a temperature of 230° C. and a load of 10 kg, a permanent set of at most 30% and a durometer A hardness of at most 96.

According to the present invention, there is yet still further provided a process for producing an olefin thermoplastic elastomer composition, which comprises the step of subjecting 100 parts by weight of an olefin random copolymer formed by copolymerizing 35 to 94.99 mol % of ethylene, 5 to 50 mol % of an α-olefin having 3 to 10 carbon atoms, 0.01 to 5 mol % of a functional cyclic compound represented by the general formula (1) and 0 to 10 mol % of a non-conjugated diene, 0.1 to 20 parts by weight of a metal compound, and at most 300 parts by weight of a polymeric compound selected from a thermoplastic resin and rubber and/or at most 100 parts by weight of a softening agent to a dynamic heat treatment under conditions of a temperature of 120 to 350° C. and a shear rate of 10 to 2,000 $s^{-1}$.

According to the present invention, there is yet still further provided a molded or formed product formed of the olefin thermoplastic elastomer or olefin thermoplastic elastomer composition described above.

BEST MODE FOR CARRYING OUT THE INVENTION

The embodiments of the present invention will hereinafter be described in detail.

The olefin thermoplastic elastomer according to the present invention comprises an olefin random copolymer (hereinafter referred to as "specific functional group-containing copolymer") formed by copolymerizing at least ethylene, an α-olefin having 3 to 10 carbon atoms and a compound having a functional group, and metal ions crosslinking the specific functional group-containing copolymer.

[Specific Functional Group-Containing Copolymer]

In the specific functional group-containing copolymer making up the olefin thermoplastic elastomer according to the present invention, ethylene is used as an essential monomer component.

The proportion of ethylene used is preferably 35 to 94.99 mol %, more preferably 40 to 89.99 mol %, particularly preferably 45 to 84.99 mol % based on the whole monomer component.

If the proportion of ethylene used is lower than 35 mol %, it may be difficult in some cases to copolymerize a functional cyclic compound, which will be described subsequently. If the proportion of ethylene used exceeds 94.99 mol % on the other hand, it may be difficult in some cases to achieve rubber elasticity required in the resulting thermoplastic elastomer.

In the specific functional group-containing copolymer, an α-olefin (hereinafter referred to as "specific α-olefin") having 3 to 10 carbon atoms is used as an essential monomer. When the α-olefin having at most 10 carbon atoms is used, the copolymerizability of such an α-olefin with other monomers becomes satisfactory.

As specific examples of the specific α-olefin, may be mentioned propylene, 1-butene, 1-pentene, 4-methyl-pentene-1,1-hexene, 1-heptene, 1-octene and 1-decene. Among these, propylene, 1-butene, 1-hexene and 1-octene are preferred, with propylene and 1-butene being more preferred.

These compounds may be used either alone or in any combination thereof.

The proportion of the specific α-olefin used is preferably 5 to 50 mol %, more preferably 10 to 45 mol %, particularly preferably 15 to 40 mol % based on the whole monomer component.

If the proportion of the specific α-olefin used is lower than 5 mol %, it may be difficult in some cases to achieve rubber elasticity required in the resulting thermoplastic elastomer. If the proportion of ethylene used exceeds 50 mol % on the other hand, the durability of the resulting elastomer may be deteriorated in some cases.

In the specific functional group-containing copolymer, an unsaturated monomer (hereinafter referred to as "functional group-containing unsaturated monomer") having a functional group which can be crosslinked with metal ions is used as an essential monomer. This functional group-containing unsaturated monomer preferably has a carboxyl group, hydroxyl group, epoxy group or sulfonic group as a functional group.

As such a functional group-containing unsaturated monomer, is preferably used a functional cyclic compound (hereinafter referred to as "specific functional cyclic compound") represented by the above general formula (1).

In the general formula (1) representing the specific functional cyclic compound, $R^1$ is a hydrogen atom or a hydrocarbon group having 1 to 10 carbon atoms, $Y^1$, $Y^2$ and $Y^3$ are, independently of one another, a hydrogen atom, a hydrocarbon group having 1 to 10 carbon atoms or —COOH, with the proviso that at least one of $Y^1$, $Y^2$ and $Y^3$ is —COOH. When at least two of $Y^1$, $Y^2$ and $Y^3$ are —COOH, they may be bonded to each other to form an acid anhydride (—CO—(O)—CO—).

As specific examples of the hydrocarbon group having 1 to 10 carbon atoms, may be mentioned methyl, ethyl, propyl, butyl, pentyl, hexyl, heptyl, octyl, nonyl and decyl groups.

The number o of repetition is an integer of 0 to 2. If the number o of repetition is 3 or more, it may be difficult in some cases to copolymerize such a cyclic compound with other monomers. The number p of repetition is an integer of 0 to 5.

Such a specific functional cyclic compound may be prepared by condensing cyclopentadiene with a functional group-containing unsaturated compound by the Diels-Alder reaction.

As specific examples of the specific functional cyclic compound, may be mentioned:
5,6-dimethyl-5,6-dicarboxy-bicyclo[2.2.1]-2-heptene,
5,6-diethyl-5,6-dicarboxy-bicyclo[2.2.1]-2-heptene,
5,6-dimethyl-5,6-bis(carboxymethyl)-bicyclo-[2.2.1]-2-heptene,
5,6-diethyl-5,6-bis(carboxymethyl)-bicyclo-[2.2.1]-2-heptene,
5-methyl-5-carboxy-bicyclo[2.2.1]-2-heptene,
5-ethyl-5-carboxy-bicyclo[2.2.1]-2-heptene,
5-carboxy-5-carboxymethyl-bicyclo[2.2.1]-2-heptene,
5-methyl-5-carboxymethyl-bicyclo[2.2.1]-2-heptene,
5-ethyl-5-carboxymethyl-bicyclo[2.2.1]-2-heptene,
8,9-dimethyl-8,9-dicarboxy-tetracyclo-[4.4.0.1$^{2,5}$.1$^{7,10}$]-3-dodecene, 8,9-diethyl-8,9-dicarboxy-tetracyclo-[4.4.0.1$^{2,5}$.1$^{7,10}$]-3-dodecene, 8-methyl-8-carboxy-tetracyclo[4.4.0.1$^{2,5}$.1$^{7,10}$]-3-dodecene, and 8-ethyl-8-carboxy-tetracyclo[4.4.0.1$^{2,5}$.1$^{7,10}$]-3-dodecene.

The proportion of the functional group-containing unsaturated monomer used is preferably 0.01 to 5 mol %, more preferably 0.01 to 4 mol based on the whole monomer component.

If the proportion of the functional group-containing unsaturated monomer used is lower than 0.01 mol %, the crosslink density of the resulting olefin thermoplastic elastomer becomes low, and the mechanical strength and heat resistance thereof are liable to be lower. If the proportion of the functional group-containing unsaturated monomer used exceeds 5 mol % on the other hand, the crosslink density of the resulting olefin thermoplastic elastomer becomes too high, and so such an elastomer becomes too high in hardness and brittle. It is hence not preferable to use the functional group-containing unsaturated monomer in such a low or high proportion. In the specific functional group-containing copolymer, a non-conjugated diene may be used as an optional monomer component in addition to the above-described essential monomer components.

As specific examples of the non-conjugated diene, may be mentioned linear acyclic dienes such as 1,4-hexadiene, 1,6-hexadiene and 1,5-hexadiene, branched-chain acyclic dienes such as 5-methyl-1,4-hexadiene, 3,7-dimethyl-1,6-octadiene, 5,7-dimethyl-1,6-octadiene, 3,7-dimethyl-1,7-octadiene, 7-methyl-1,6-octadiene and dihydromyrcene, and alicyclic dienes such as tetrahydroindene, methyl-tetrahydroindene, dicyclopentadiene, bicyclo[2.2.1]-hept-2,5-diene, 5-methylene-2-norbornene, 5-ethylidene-2-norbornene, 5-propenyl-2-norbornene, 5-isopropylidene-2-norbornene, 5-cyclohexylidene-2-norbornene and 5-vinyl-2-norbornene. These compounds may be used either alone or in any combination thereof.

As preferred compounds among the above-mentioned non-conjugated dienes, may be mentioned 1,4-hexadiene, dicyclopentadiene and 5-ethylidene-2-norbornene.

The proportion of the non-conjugated diene used is preferably 0 to 10 mol % based on the whole monomer component. If the proportion of the non-conjugated diene used exceeds 10 mol %, the durability of the resulting elastomer may become low in some cases.

The weight average molecular weight Mw of the specific functional group-containing copolymer is generally 1,000 to 3,000,000, preferably 3,000 to 1,000,000, more preferably 5,000 to 700,000 in terms of polystyrene as measured by gel permeation chromatography (GPC).

The specific functional group-containing copolymer preferably has a melt flow rate (MFR) of 0.01 to 100 g/10 min, more preferably 0.05 to 50 g/10 min as measured under conditions of a temperature of 230° C. and a load of 10 kg.

Further, the specific functional group-containing copolymer preferably has a glass transition temperature of −90 to 50° C., particularly −70 to 10° C.

The specific functional group-containing copolymer may be an oil-extended polymer obtained by adding a softening agent upon polymerization.

[Metal Ions]

The metal ions used in the present invention serve to form a crosslinked structure between molecules of the specific functional group-containing copolymer by ionically bonding to the functional groups in the specific functional group-containing copolymer. As examples of such ions, may be mentioned ions of metals of Groups I to VIII in the periodic table, such as lithium, potassium, sodium, aluminum, magnesium, calcium, barium, cesium, strontium, rubidium, titanium, zinc, copper, iron, tin and lead. Among these, are preferred metal ions of potassium, sodium, aluminum, magnesium, barium, zinc, iron, calcium, titanium and lead.

The olefin thermoplastic elastomer according to the present invention can be produced in the following manner.

The specific functional group-containing copolymer is first prepared by copolymerizing ethylene, the specific α-olefin and the functional group-containing unsaturated monomer, and optionally the non-conjugated diene.

No particular limitation is imposed on the specific preparation process of the specific functional group-containing copolymer. However, the process described in Japanese Patent Publication Laid Open No. 2001-247629 may be suitably used.

The specific functional group-containing copolymer (hereinafter also referred to as "Component (A)") is then mixed with a metal compound (hereinafter also referred to as "Component (B)") for supplying the metal ions for crosslinking this copolymer under suitable conditions capable of forming a crosslinked structure, whereby the olefin thermoplastic elastomer according to the present invention is obtained.

As the metal compound making up Component (B), may be used a metal oxide, metal hydroxide, metal salt, a metal complex or the like.

As specific examples of the metal oxide used as Component (B), may be mentioned CuO, MgO, BaO, ZnO, Al$_2$O$_3$, Fe$_2$O$_3$, SnO, CaO and TiO$_2$.

As specific examples of the metal hydroxide used as Component (B), may be mentioned LiOH, NaOH, KOH, Cu(OH)$_2$, Cu$_2$O(OH)$_2$, Mg(OH)$_2$, Mg$_2$O(OH)$_2$, Ba(OH)$_2$, Zn(OH)$_2$, Sn(OH)$_2$ and Ca(OH)$_2$.

These metal compounds may be those treated with a silane coupling agent or higher fatty acid for the purpose of improving its dispersibility in the specific functional group-containing copolymer which is Component (A).

These metal compounds may be used either alone or in any combination thereof.

The proportion of the metal compound used as Component (B) is generally 0.1 to 20 parts by weight, preferably 0.2 to 15 parts by weight, particularly 0.5 to 5 parts by weight per 100 parts by weight of the specific functional group-containing copolymer as Component (A). If this proportion is lower than 0.1 parts by weight, the crosslink density of the resulting olefin thermoplastic elastomer becomes low, and the mechanical strength and heat resistance thereof are liable to be lower. If this proportion exceeds 20 parts by weight on the other hand, the crosslink density of the resulting olefin thermoplastic elastomer becomes too high, and so such an elastomer becomes too high in hardness and brittle. It is hence not preferable to use the metal compound in such a low or high proportion.

A metal salt of a carboxylic acid may be added as an activator in addition to the metal compound used as Component (B) for the purpose of improving the miscibility of the metal compound with the specific functional group-containing copolymer and the heat resistance of the resulting olefin thermoplastic elastomer.

As the metal salt of the carboxylic acid, is preferably used a metal salt of a mono-carboxylic acid, and further, the carboxylic acid is more preferably that having 3 to 23 carbon atoms. Specific examples of the carboxylic acid include propionic acid, acrylic acid, butyric acid, methacrylic acid, valeric acid, hexanoic acid, octanoic acid, 2-ethylhexanoic acid, decanoic acid, palmitic acid, myristic acid, lauric acid, stearic acid, oleic acid, behenic acid, naphthenic acid and benzoic acid.

A metal component in the metal salt used as the activator may be selected for use from the metal components exemplified as the metal ions making up the olefin thermoplastic elastomer. It is however preferred to use a metal salt containing the same metal component as the metal component in the metal compound used as Component (B).

The proportion of the metal salt used as the activator is generally 0.3 to 20 parts by weight, preferably 1 to 15 parts by weight per 100 parts by weight of the specific functional group-containing copolymer as Component (A). If this proportion is lower than 0.3 parts by weight, the effect by use of the activator cannot be sufficiently attained. If this proportion exceeds 20 parts by weight on the other hand, the oil resistance and mechanical strength of the resulting olefin thermoplastic elastomer may be markedly lowered in some cases.

As methods for mixing Component (A), Component (B) and the activator used as needed with each other, may be used various methods such as a method in which solutions or dispersions of the respective components are prepared, and these solutions or dispersions are mixed with each other, and a method in which a melt kneader generally used is used. However, a method in which mixing is conducted under heating is preferred in that an olefin thermoplastic elastomer having stable properties is obtained. As examples, may be mentioned the following methods (I) and (II):

(I) A method in which a solution of the specific functional group-containing copolymer as Component (A) dissolved in a proper solvent is mixed under heating with a solution or dispersion of the metal compound as Component (B) and the activator used as needed dissolved or dispersed in a proper solvent, and the solvent(s) are removed from the resultant liquid mixture.

(II) A method in which the specific functional group-containing copolymer as Component (A), the metal compound as Component (B) and the activator used as needed are mixed with one another, and the resultant mixture is subjected to a dynamic heat treatment.

No particular limitation is imposed on the solvents used in the method (I). As such solvents, may be preferably used, for example, aliphatic hydrocarbons, alicyclic hydrocarbons, aromatic hydrocarbons and halides thereof in that the specific functional group-containing copolymer is easily dissolved. As specific examples thereof, may be mentioned butane, pentane, hexane, heptane, 2-butene, 2-methyl-2-butene, cyclopentane, methylcyclopentane, cyclohexane, isooctane, benzene, toluene, xylene, chlorobenzene, dichloromethane and dichloroethane.

When the solubility of Component (B) and the activator used in the solvent mentioned as above is low, a dispersion of Component (B) and the activator dispersed in a suspended state in the solvent may be prepared, or any other solvent than the above solvents or additive may be added for dissolving Component (B) and the activator.

The proportion of the specific functional group-containing copolymer in the solution is preferably 0.1 to 60% by weight, more preferably 0.2 to 50% by weight.

The proportion of Component (B) and the activator in the solution or dispersion is preferably 0.01 to 60% by weight, more preferably 0.05 to 50% by weight in total of both.

The mixing of the solutions or the solution and the dispersion may be conducted by means of a solution stirring device generally used, and the temperature upon the mixing is preferably at least 20° C., more preferably at least 30° C.

Upon the mixing of the solutions or the solution and the dispersion, a suitable catalyst may be added for the purpose of accelerating a crosslinking reaction with the metal.

The olefin thermoplastic elastomer according to the present invention is obtained by removing the solvent(s) from the liquid mixture obtained in the above-described manner by a well-known method such as heating, pressure reduction or steam distillation. The olefin thermoplastic elastomer according to the present invention may also be obtained as a film by casting the liquid mixture on a suitable base and then removing the solvent(s).

The term "dynamic heat treatment" in the method (II) means a treatment that both of a shearing force-applying treatment and a heat treatment are conducted. Such dynamic heat treatment may be conducted by means of, for example, a melt kneader. The melt kneader may be any of the batch type and the continuous type. As specific examples of the melt kneader, may be mentioned batch type melt kneaders such as an open type mixing roll, and non-open type Banbury mixer and kneader, and continuous type melt kneaders such as single-screw extruder, a same-direction rotating type continuous twin-screw extruder and an opposite-direction rotating type continuous twin-screw extruder.

As specific methods, may be mentioned the following methods (II-1) and (II-2):

(II-1) A mixture containing the specific functional group-containing copolymer as Component (A), the metal compound as Component (B) and activator used as needed is continuously subjected to a dynamic heat treatment with exothermic heat by shearing by means of a twin-screw extruder, thereby obtaining the olefin thermoplastic elastomer according to the present invention.

(II-2) A mixture containing the specific functional group-containing copolymer as Component (A), the metal compound as Component (B) and activator used as needed is subjected to a dynamic heat treatment with exothermic heat by shearing by means of a batch type kneader, thereby obtaining the olefin thermoplastic elastomer according to the present invention.

The conditions in the dynamic heat treatment varies according to the melting point of the specific functional group-containing copolymer used as Component (A), the kinds of the metal compound used as Component (B), the kind of the melt kneader and the like. However, the treatment temperature is 120 to 350° C., preferably 150 to 290° C., and the treatment time is 20 seconds to 320 minutes, preferably 30 seconds to 25 minutes. The shearing force applied to the mixture is 10 to 2,000/sec, preferably 100 to 1000/sec in terms of a shear rate.

Since the olefin thermoplastic elastomer according to the present invention obtained in such a manner has a melt flow rate (MFR) of at least 0.5 g/10 min, preferably at least 1 g/10 min as measured under conditions of a temperature of 230° C. and a load of 10 kg and a permanent set of at most 30%, preferably at most 20%, it has the same or similar rubber elasticity and molding or forming and processability as those of the conventional olefin thermoplastic elastomers, and moreover has good flexibility, mechanical strength and wear resistance and is excellent in scratch resistance in particular as apparent from Examples which will be described subsequently.

[Olefin Thermoplastic Elastomer Composition]

The olefin thermoplastic elastomer according to the present invention can be used as an olefin thermoplastic elastomer composition by mixing it with a polymeric compound (hereinafter also referred to as "Component (C)") selected from a thermoplastic resin and rubber.

As the thermoplastic resin and rubber used as Component (C), various resins and rubbers may be used without particular limitation so far as they are those other than the specific functional group-containing copolymer, and specific examples thereof include polyethylene and maleic anhydride-grafted polymers thereof, polyisobutylene, ethylene.vinyl acetate copolymers, ethylene acrylate, ethylene-.acrylic acid copolymers, polypropylene and maleic anhydride-grafted polymers thereof, polyisobutylene, chlorinated polypropylene, 4-methyl-1-pentene resins, polystyrene, ABS resins, AS resins, acrylic resins, methacrylic resins, vinyl chloride resins, vinylidene chloride resins, polyamide resins, polycarbonates, ethylene.α-olefin copolymer rubber and maleic anhydride-grafted polymers thereof, ethylene.α-olefin-non-conjugated diene copolymer rubber, styrene.butadiene rubber and hydrogenated products thereof, maleic anhydride-grafted polymers of hydrogenated products of styrene.butadiene rubber, butadiene rubber and hydrogenated products thereof, maleic anhydride-grafted polymers of hydrogenated products of butadiene rubber, isoprene rubber and hydrogenated products thereof, maleic anhydride-grafted polymers of hydrogenated products of isoprene rubber, styrene.isoprene rubber and hydrogenated products thereof, maleic anhydride-grafted polymers of hydrogenated products of styrene.isoprene rubber, nitrile rubber and hydrogenated products thereof, acrylic rubber, silicone rubber, fluorocarbonrubber, butyl rubber, and natural rubber. Polyethylene and polypropylene are particularly preferred. These polymeric compounds may be used as Component (C) either alone or in any combination thereof.

The proportion of the polymeric compound used as Component (C) is at most 300 parts by weight, preferably 1 to 200 parts by weight per 100 parts by weight of the specific functional group-containing copolymer making up the olefin thermoplastic elastomer.

The olefin thermoplastic elastomer according to the present invention can be used as an olefin thermoplastic elastomer composition by adding a softening agent (hereinafter also referred to as "Component (D)") thereto.

The softening agent used as Component (D) may be either added to a monomer solution for obtaining the specific functional group-containing copolymer making up the olefin thermoplastic elastomer or added upon the production of the olefin thermoplastic elastomer or after the production thereof.

No particular limitation is imposed on the softening agent used as Component (D) so far as it is a softening agent for rubber generally used, and examples thereof include paraffinic, naphthenic and aromatic mineral oil type hydrocarbons and low-molecular weight hydrocarbons of the polybutene and polybutadiene types, and the like. Among these, mineral oil type hydrocarbons are preferred, and those having a weight average molecular weight of 300 to 2000, particularly 500 to 1500 are preferred.

The softening agent for rubber composed of mineral oil type hydrocarbons is generally a mixture of three of aromatic hydrocarbons, naphthenic hydrocarbons and paraffinic hydrocarbons, and those that the number of carbon atoms belonging to paraffinic hydrocarbons is at least 50% of the whole number of carbon atoms, those that the number of carbon atoms belonging to naphthenic hydrocarbons is 30 to 45% of the whole number of carbon atoms, and those that the number of carbon atoms belonging to aromatic hydrocarbons is at least 30% of the whole number of carbon atoms are classified as paraffin type oil, naphthenic type oil and aromatic type oil, respectively. In the present invention, paraffin type oil is preferred, with hydrogenated paraffin type oil being particularly preferred. The mineral oil type hydrocarbons preferably have a kinematic viscosity of 20 to 800 cSt, particularly 50 to 600 cSt at 40° C. and a pour point of −40 to 0° C., particularly −30 to 0° C.

The proportion of the softening agent used as Component (D) is at most 100 parts by weight, preferably 1 to 67 parts by weight per 100 parts by weight of the specific functional group-containing copolymer making up the olefin thermoplastic elastomer.

The olefin thermoplastic elastomer composition according to the present invention may be produced by adding the polymeric compound as Component (C) and/or the softening agent as Component (D) to the olefin thermoplastic elastomer and heating and mixing them. However, as preferred preparation methods, may be mentioned the following methods (III) and (IV):

(III) A method in which a solution of the specific functional group-containing copolymer as Component (A) dissolved in a proper solvent is mixed under heating with a solution or dispersion of the metal compound as Component (B) and the activator used as needed dissolved or dispersed in a proper solvent and a solution or dispersion of the polymeric compound as Component (C) and/or the softening agent as Component (D) dissolved or dispersed in a proper solvent, and the solvent(s) are removed from the resultant liquid mixture.

No particular limitation is imposed on the solvents used in this method. It is however preferred to use, for example, aliphatic hydrocarbons, alicyclic hydrocarbons, aromatic hydrocarbon and halides thereof in that the specific functional group-containing copolymer is easily dissolved. As specific examples thereof, may be mentioned butane, pentane, hexane, heptane, 2-butene, 2-methyl-2-butene, cyclopentane, methylcyclopentane, cyclohexane, isooctane, benzene, toluene, xylene, chlorobenzene, dichloromethane and dichloroethane.

When the solubility of Component (B) and the activator used in the above solvent is low, a dispersion of Component (B) and the activator dispersed in a suspended state in the solvent may be prepared, or any other solvent or additive than the above solvents may be added for dissolving Component (B) and the activator.

When the solubility of Component (C) and Component (D) in the above solvent is low, they may be dispersed in a suspended state in the solvent, any other solvent than the above solvents or additive may be added for dissolving Component (C) and Component (D), or Component (C) and Component (D) may be added after removing the solvent(s), and the resultant mixture may be subjected to the dynamic heat treatment.

The mixing of the solutions or the solution and the dispersion(s) may be conducted by means of a solution stirring device generally used, and the temperature upon the mixing is preferably at least 20° C., more preferably at least 30° C.

Upon the mixing of the solutions or the solution and the dispersion(s), a suitable catalyst may be added for the purpose of accelerating a crosslinking reaction with the metal.

The olefin thermoplastic elastomer composition according to the present invention is obtained by removing the solvent(s) from the liquid mixture obtained in the above-described manner by a well-known method such as heating, pressure reduction or steam distillation. The olefin thermoplastic elastomer composition according to the present invention may also be obtained as a film by casting the liquid mixture on a suitable base and then removing the solvent(s).

(IV) A method in which the specific functional group-containing copolymer as Component (A), the metal compound as Component (B), the activator used as needed, and the polymeric compound as Component (C) and/or the softening agent as Component (D) are mixed with one another, and the resultant mixture is subjected to a dynamic heat treatment.

The conditions for the dynamic heat treatment in this method varies according to the melting point of the specific functional group-containing copolymer used as Component (A), the kind of the metal compound used as Component (B), the melting point of the polymeric compound used as Component (C), the kind of the melt kneader, and the like. However, the treatment temperature is 120 to 350° C., preferably 150 to 290° C., and the treatment time is 20 seconds to 320 minutes, preferably 30 seconds to 25 minutes. The shearing force applied to the mixture is 10 to 2,000 $s^{-1}$, preferably 100 to 1000 $s^{-1}$ in terms of a shear rate.

Since the olefin thermoplastic elastomer composition according to the present invention obtained in such a manner has a melt flow rate (MFR) of at least 0.5 g/10 min, preferably at least 1 g/10 min as measured under conditions of a temperature of 230° C. and a load of 10 kg, a permanent set of at most 30%, preferably at most 20% and a durometer A hardness of at most 96, preferably at most 90, it has the same or similar rubber elasticity, flexibility and molding or forming and processability as those of the conventional olefin thermoplastic elastomer compositions, and moreover has good mechanical strength and wear resistance and is excellent in scratch resistance in particular as apparent from Examples which will be described subsequently.

Into the olefin thermoplastic elastomer composition according to the present invention, may be incorporated for use various kinds of additives as needed, for example, lubricants, stabilizers such as antioxidants, heat stabilizers, weathering agents, metal inactivators, ultraviolet absorbents, light stabilizers and copper inhibitors, antiseptic and mildewproofing agents, dispersing agents, plasticizers, nucleating agents, flame retardants, tackifiers, foaming aids, colorants such as titanium oxide and carbon black, fillers such as powders of metals such as ferrite, inorganic fibers such as glass fibers and metal fibers, organic fibers such as carbon fibers and aramide fibers, composite fibers, inorganic whiskers such as potassium titanate whisker, glass beads, glass balloons, glass flakes, asbestos, mica, calcium carbonate, talc, silica, calcium silicate, hydrotalcite, kaolin, diatomaceous earth, graphite, pumice, ebonite powder, cotton flock, cork powder, barium sulfate, fluorocarbonresins and polymer beads, or mixtures thereof, fillers such as polyolefin waxes, cellulose powder, rubber powder and wood powder, and low-molecular weight polymers.

The olefin thermoplastic elastomers and their compositions according to the present invention may be easily processed by melt molding or forming such as injection molding, extrusion, blow molding, compression molding, vacuum forming, laminate molding or calendering because the specific functional group-containing copolymer therein is crosslinked with metal ions, whereby molded or formed thermoplastic elastomer products excellent in rubber elasticity, flexibility and mechanical properties can be provided.

The molded or formed products composed of the olefin thermoplastic elastomers and their compositions according to the present invention may also be used by bonding to or multi-layer laminating on ordinary molded or formed olefin vulcanized rubber products or ordinary molded or formed olefin thermoplastic elastomer products.

Since the olefin thermoplastic elastomers and their compositions according to the present invention have excellent rubber elasticity, flexibility, molding or forming and processability and scratch resistance, they can be widely used as interior or exterior surface materials for automotive bumpers, exterior trims, window sealing gaskets, door sealing gaskets, gaskets for trunk room, roof side rails, emblems, inner panels, door trims and console boxes, weatherstrips and the like, leather sheets of which scratch resistance is required, sealing materials, interior or exterior surface materials and the like for aircrafts and marine vessels, sealing materials, interior or exterior surface materials, waterproofing sheet materials and the like for civil engineering and construction, sealing materials and the like for general machines and apparatus, packings, skins, housings and the like for light electric parts, rolls and cleaning blades for information instruments, films and sealing materials for electronic parts, protecting films for images such as photographs, decorative films for building materials, medical instrument parts, electric wires, daily needs and sports goods as the general processed products in which the conventional olefin thermoplastic elastomers are in use.

The present invention will hereinafter be described specifically by the following examples. However, the present invention is not limited by these examples.

Various components used in the following examples and comparative examples are as follows:

[Olefin Random Copolymer]

(1) Specific Functional Group-Containing Copolymer (A-1):

A specific functional group-containing copolymer in which the content of the structural unit derived from ethylene is 77.4 mol %, the content of the structural unit derived from propylene is 21.8 mol %, the content of the structural unit derived from 5-ethylidene-2-norbornene is 0 mol %, and the content of the structural unit derived from 5-methyl-5-carboxy-bicyclo-[2.2.1]-2-heptene is 0.8 mol %, and the weight average molecular weight (Mw) is $13.1 \times 10^4$.

(2) Specific Functional Group-Containing Copolymer (A-2):

A specific functional group-containing copolymer in which the content of the structural unit derived from ethylene is 75.8 mol %, the content of the structural unit derived from propylene is 22.4 mol %, the content of the structural unit derived from 5-ethylidene-2-norbornene is 1.2 mol %, and the content of the structural unit derived from 5-methyl-5-carboxy-bicyclo-[2.2.1]-2-heptene is 0.6 mol %, and the weight average molecular weight (Mw) is $18.6 \times 10^4$.

(3) Specific Functional Group-Containing Copolymer (A-3):

A specific functional group-containing copolymer in which the content of the structural unit derived from ethylene is 86.1 mol %, the content of the structural unit derived from propylene is 10.6 mol %, the content of the structural unit derived from 5-ethylidene-2-norbornene is 2.6 mol %, and the content of the structural unit derived from 5-methyl-5-carboxy-bicyclo-[2.2.1]-2-heptene is 0.7 mol %, and the weight average molecular weight (Mw) is $16.5 \times 10^4$.

(4) Olefin Copolymer (H-1):

An olefin random copolymer (product of JSR Corporation; trade name "EP57P") in which the content of the structural unit derived from ethylene is 76.1 mol %, the content of the structural unit derived from propylene is 22.7 mol %, and the content of the structural unit derived from 5-ethylidene-2-norbornene is 1.2 mol %, and the Mooney viscosity ($ML_{1+4}$, 100° C.) is 88.

(5) Maleic Anhydride-Modified Copolymer (H-2):

A maleic anhydride-modified olefin random copolymer (product of JSR Corporation; trade name "T7761P") in which the content of the structural unit derived from ethylene is 80.4 mol %, the content of the structural unit derived from propylene is 19.3 mol %, and the content of the structural unit derived from 5-ethylidene-2-norbornene is 0 mol %, the amount of acid addition is 0.3 mol %, and the Mooney viscosity ($ML_{1+4}$, 100° C.) is 63.

[Metallic Compound]

(1) Metal Compound (B-1):

Magnesium hydroxide (product of Kyowa Chemicals Co., Ltd.; trade name "Kisuma 5A") surface-treated with a higher fatty acid.

(2) Metal Compound (B-2):

Magnesium hydroxide (product of Kyowa Chemicals Co., Ltd.; trade name "Kisuma 5NH") surface-treated with a silane coupling agent.

(3) Metal Compound (B-3):

Zinc oxide (zinc white).

[Polymeric Compound]

(1) Polyethylene Resin (C-1):

A linear, low-density polyethylene resin (product of Japan Polychem Co., Ltd.; trade name "Novatec LLDPE UF423") having an MFR (measured at a temperature of 190° C. and a load of 2.16 kg) of 0.8 g/10 min.

(2) Polypropylene Resin (C-2):

A propylene resin (product of Japan Polychem Co., Ltd.; trade name "Novatec PP MA4") having an MFR (measured at a temperature of 230° C. and a load of 2.16 kg) of 5 g/10 min.

(3) Rubber (C-3)

Ethylene-propylene copolymer rubber (ethylene content= 78.6 mol %, propylene content=21.4 mol %, 5-ethylidene-2-norbornene content=0 mol %; the Mooney viscosity ($ML_{1+4}$, 100° C.)=25; product of JSR Corporation; trade name "EP02P").

[Softening Agent]

Softening agent (D-1):

Hydrogenated paraffinic mineral oil (product of Idemitsu Kosan Co., Ltd.; trade name "Dyana Process Oil PW380").

[Other Additives]

Activator (I-1): Magnesium stearate.

Activator (I-2): Zinc stearate.

Organic Peroxide (K-1): 2,5-Dimethyl-2,5-di(tert-butylperoxy)hexane (product of Nippon Oil & Fats Co., Ltd.; trade name "Perhexa 25B40").

Crosslinking Aid (L-1): Divinylbenzene (product of Sankyo Chemical Industries, Ltd.) having a purity of 55%.

Antioxidant (M-1): 2-[1-(2-Hydroxy-3,5-di-tert-pentylphenyl)ethyl]-4,6-di-tert-pentylphenyl acrylate (product of Sumitomo Chemical Co., Ltd.; trade name "Sumilizer GS").

Antioxidant (M-2): Bis(2,6-di-tert-butyl-4-methylphenyl) pentaerythritol diphosphite (product of Asahi Denka Co. Ltd; trade name "Adekastab PEP-36").

EXAMPLE 1

A 10-L double arm type pressurizing kneader (manufactured by Moriyama Company, Ltd.) heated to 230° C. was charged with 100 parts by weight of the specific functional group-containing copolymer (A-1), 1 part by weight of the metal compound (B-1) and 4.5 parts by weight of the activator (I-1), and the contents were kneaded (at a shear rate of 200 $s^{-1}$) for 20 minutes at 40 rpm. The resultant bulk kneaded product in molten state was then pelletized by a feeder extruder (manufactured by Moriyama Company, Ltd.) set at 180° C. and 40 rpm to obtain an olefin thermoplastic elastomer.

The thus-obtained pellets of the olefin thermoplastic elastomer were subjected to press molding under conditions of a mold temperature of 180° C., a pressurizing and heating time of 10 minutes and pressurizing and cooling time of 5 minutes by means of an electrically heated pressurizing press molding machine (manufactured by Kansai Roll K.K.), thereby obtaining a molded sheet having a size of 12 cm×12 cm×0.2 cm.

[Evaluation of Olefin Thermoplastic Elastomer]

With respect to the olefin thermoplastic elastomer thus obtained, its melt flow rate (MFR) was measured as an index of flowability under conditions of a temperature of 230° C. and a load of 10 kg. The result is shown in the following Table 1.

The resultant molded sheet of the olefin thermoplastic elastomer was used to determine a durometer A hardness as an index of flexibility, a permanent set as an index of rubber elasticity, tensile strength at break and tensile elongation at break as mechanical strength, wear resistance, and a specific gravity in accordance with the following respective methods, and moreover conduct Scratch Resistance Test 1 and Scratch Resistance Test 2. The results are shown in Table 1.

(1) Durometer A hardness: Measured in accordance with JIS-K 6253.

(2) Permanent set: Measured in accordance with JIS-K 6262.

(3) Tensile strength at break and tensile elongation at break: Measured in accordance with JIS-K 6251.

(4) Wear resistance: A DIN abrasion test was performed in accordance with JIS-K 6264 to determine a wear resistance factor.

(5) Specific gravity: Measured in accordance with JIS-K 7112.

(6) Scratch Resistance Test 1: A T-bar scratch tester manufactured by Toyo Seiki Seisaku-sho, Ltd. was used to scan a metal claw loaded with 10 g on the surface of the molded sheet. This process was repeated until the surface of the molded sheet was marred with the load being increased 10 g by 10 g. A value of the load at the time the surface of the molded sheet was first marred was recorded. In this test, the greater the value of the load recorded, the better the scratch resistance.

(7) Scratch Resistance Test 2:

The surface of the molded sheet was rubbed with a thumb nail to visually judge the degree of marring on the surface in accordance with the following standard:

1: The surface was not marred at all;

2: The surface was slightly marred, but immediately restored to become marring-free;

3: The surface was slightly marred;

4: The surface was deeply marred.

COMPARATIVE EXAMPLE 1

The specific functional group-containing copolymer (A-1) was subjected to press molding in the same manner as in Example 1, thereby producing a molded sheet to evaluate it. The results are shown in Table 2.

EXAMPLES 2 TO 6 AND 8 TO 12, AND COMPARATIVE EXAMPLES 2 AND 3

A 10-L double arm type pressurizing kneader (manufactured by Moriyama Company, Ltd.) heated to 230° C. was charged with respective components in accordance with their corresponding formulations shown in Tables 1 and 2, and the respective contents were kneaded for 20 minutes at 40 rpm. Each of the resultant bulk kneaded products in a molten state was then pelletized by a feeder extruder (manufactured by Moriyama Company, Ltd.) set at 180° C. and 40 rpm to obtain an olefin thermoplastic elastomer or olefin thermoplastic elastomer composition.

The thus-obtained pellets of the olefin thermoplastic elastomer or olefin thermoplastic elastomer composition were subjected to press molding in the same manner as in Example 1, whereby a molded sheet was produced to evaluate it. The results are shown in Tables 1 and 2.

EXAMPLE 7

A solution of the specific functional group-containing copolymer (A-3) dissolved in xylene so as to give the copolymer concentration of 5% by weight was prepared, and a suspension of the metal compound (B-2) and the activator (I-1) finely dispersed in xylene so as to give concentrations of 1.0% by weight and 4.5% by weight, respectively, was prepared. The solution and the suspension were mixed with each other so as to give the mixing proportions of the specific functional group-containing copolymer (A-3), metal compound (B-2) and activator (I-1) shown in Table 1. While stirring the resultant liquid, it was heated at 130° C. for 30 minutes. The resultant liquid mixture was then subjected to a heat treatment under reduced pressure to remove xylene, thereby obtaining an olefin thermoplastic elastomer. The resultant olefin thermoplastic elastomer thus obtained was chopped and then subjected to press molding in the same manner as in Example 1, whereby a molded sheet was produced to evaluate it. The results are shown in Table 1.

EXAMPLE 13

A 10-L double arm type pressurizing kneader (manufactured by Moriyama Company, Ltd.) heated to 230° C. was charged with the specific functional group-containing copolymer (A-3) and the polyethylene resin (C-1) in a proportion of 100:11.1 in terms of a weight ratio, and the contents were kneaded for 20 minutes at 40 rpm. The resultant bulk kneaded product in a molten state was then pelletized by a feeder extruder (manufactured by Moriyama Company, Ltd.) set at 180° C. and 40 rpm to obtain a copolymer composition.

To 111.1 parts by weight of the thus-obtained pellets of the copolymer composition, were added 1.1 parts by weight of the metal compound (B-2) and 5.0 parts by weight of the activator (I-1), and the components were mixed for 30 seconds by means of a Henschel mixer. The resultant mixture was then extruded by means of a twin-extruder (Model "PCM-45" manufactured by Ikegai Ltd.; same-direction completely intermeshing screws; L/D, a rate of the length L of a screw flight portion to the diameter D of each screw: 33.5) while conducting a dynamic heat treatment under conditions that the mixture was retained for 2 minutes at 210° C. and 300 rpm (shear rate: 900 $s^{-1}$), thereby obtaining pellets of the olefin thermoplastic elastomer composition.

The resultant pellets of the olefin thermoplastic elastomer composition were subjected to press molding in the same manner as in Example 1, whereby a molded sheet was produced to evaluate it. The results are shown in Table 2.

COMPARATIVE EXAMPLE 4

A 10-L double arm type pressurizing kneader (manufactured by Moriyama Company, Ltd.) heated to 230° C. was charged with the maleic anhydride-modified copolymer (H-2), the polypropylene resin (C-2) and the softening agent (D-1) in a proportion of 100:33.9:35.6 in terms of a weight ratio, and the contents were kneaded for 20 minutes at 40 rpm. The resultant bulk kneaded product in a molten state was then pelletized by a feeder extruder (manufactured by Moriyama Company, Ltd.) set at 180° C. and 40 rpm to obtain a copolymer composition.

To 169.5 parts by weight of the thus-obtained pellets of the copolymer composition, were added 1.7 parts by weight of the organic peroxide (K-1) and 2.1 parts by weight of the crosslinking aid (L-1), and their components were mixed for 30 seconds by means of a Henschel mixer. The resultant mixture was then extruded by means of a twin-extruder (Model "PCM-45" manufactured by Ikegai Ltd.; same-direction completely intermeshing screws; L/D, a rate of the length L of a screw flight portion to the diameter D of each screw: 33.5) while conducting a dynamic heat treatment under conditions that the mixture was retained for 2 minutes at 210° C. and 300 rpm (shear rate: 900 $s^{-1}$), thereby obtaining pellets of the olefin thermoplastic elastomer composition.

The resultant pellets of the olefin thermoplastic elastomer composition were subjected to press molding in the same manner as in Example 1, whereby a molded sheet was produced to evaluate it. The results are shown in Table 2.

TABLE 1

|  | Examples | | | | | | | | |
|---|---|---|---|---|---|---|---|---|---|
|  | 1 | 2 | 3 | 4 | 5 | 6 | 7 | 8 | 9 |
| Formulation of components (parts by weight) | | | | | | | | | |
| Specific functional group-containing copolymer (A-1) | 100 | 100 | 100 | — | 100 | — | — | — | — |
| Specific functional group-containing copolymer (A-2) | — | — | — | 100 | — | — | — | — | — |
| Specific functional group-containing copolymer (A-3) | — | — | — | — | — | 100 | 100 | 100 | 100 |
| Metal compound (B-1) | 1.0 | 1.1 | 1.2 | — | — | — | — | — | — |
| Metal compound (B-2) | — | — | — | 1.4 | — | 1.0 | 1.0 | 1.1 | 2.0 |
| Polyethylene resin (C-1) | — | 11.1 | — | — | 13.0 | — | — | 11.1 | 100 |
| Softening agent (D-1) | — | — | 17.6 | 42.9 | 16.9 | — | — | — | — |
| Activator (I-1) | 4.5 | 5.0 | 5.3 | 6.4 | 5.8 | 4.5 | 4.5 | 5.0 | 9.0 |
| Mixing method | Kneader | Kneader | Kneader | Kneader | Kneader | Kneader | Solution | Kneader | Kneader |
| Evaluation Results | | | | | | | | | |
| MFR (230° C., 10 kg) [g/10 min] | 67 | 59 | 183 | 20 | 152 | 6.4 | 5.9 | 9.0 | 9.3 |
| Durometer A hardness | 71 | 75 | 63 | 48 | 68 | 64 | 66 | 72 | 95 |
| Parmanent set [%] | 7 | 9 | 8 | 5 | 10 | 4 | 3 | 6 | 18 |
| Tensile strength at break [MPa] | 4.5 | 4.6 | 3.1 | 5.4 | 3.1 | 13.7 | 16.2 | 21.0 | 22.5 |
| Tensile elongation at break [%] | 690 | 580 | 700 | 940 | 510 | 800 | 780 | 810 | 840 |
| Wear registance | 48 | 51 | 52 | 50 | 51 | 34 | 30 | 35 | 39 |
| Specific gravity | 0.891 | 0.895 | 0.893 | 0.893 | 0.895 | 0.898 | 0.898 | 0.902 | 0.916 |

TABLE 1-continued

|  | Examples | | | | | | | | |
| --- | --- | --- | --- | --- | --- | --- | --- | --- | --- |
|  | 1 | 2 | 3 | 4 | 5 | 6 | 7 | 8 | 9 |
| Mar Registance Test 1 | 100 | 80 | 80 | 90 | 80 | 500 | 550 | 300 | 110 |
| Mar Registance Test 2 | 2 | 2 | 2 | 2 | 2 | 1 | 1 | 2 | 2 |

TABLE 2

|  | Examples | | | | Comparative examples | | | |
| --- | --- | --- | --- | --- | --- | --- | --- | --- |
|  | 10 | 11 | 12 | 13 | 1 | 2 | 3 | 4 |
| Formulation of components (parts by weight) | | | | | | | | |
| Specific functional group-containing copolymer (A-1) | — | — | — | — | 100 | — | — | — |
| Specific functional group-containing copolymer (A-3) | 100 | 100 | 100 | 100 | — | — | — | — |
| Olefin copolymer (H-1) | — | — | — | — | — | 100 | — | 100 |
| Maleic anhydride-modified copolymer (H-2) | — | — | — | — | — | — | 100 | — |
| Metal compound (B-2) | 1.1 | — | 1.1 | 1.1 | — | 1.4 | 1.4 | — |
| Metal compound (B-3) | — | 1.1 | — | — | — | — | — | — |
| Polyethylene resin (C-1) | — | 11.1 | 11.1 | 11.1 | — | — | — | — |
| Polypropylene resin (C-2) | — | — | — | — | — | — | — | 33.9 |
| Rubber (C-3) | 11.1 | — | — | — | — | — | — | — |
| Softening agent (D-1) | — | — | — | — | — | 42.9 | 42.9 | 35.6 |
| Activator (I-1) | 5.0 | — | 5.0 | 5.0 | — | 6.4 | 6.4 | — |
| Activator (I-2) | — | 5.0 | — | — | — | — | — | — |
| Organic peroxide (K-1) | — | — | — | — | — | — | — | 1.7 |
| Crosslinking aid (L-1) | — | — | — | — | — | — | — | 2.1 |
| Antioxidant (M-1) | — | — | 0.2 | 0.2 | — | — | — | — |
| Antioxidant (M-2) | — | — | 0.2 | 0.2 | — | — | — | — |
| Mixing method | Kneader | Kneader | Kneader | Extruder | — | Kneader | Kneader | Extruder |
| Evaluation Results | | | | | | | | |
| MFR (230° C., 10 kg) [g/10 min] | 9.1 | 5.8 | 9.0 | 2.7 | 60 | 8.2 | Not flowed | 1.0 |
| Durometer A hardness | 68 | 73 | 72 | 73 | 48 | 38 | 58 | 75 |
| Parmanent set [%] | 5 | 8 | 5 | 3 | 136 | 107 | 9 | 15 |
| Tensile strength at break [MPa] | 18.3 | 20.5 | 22.6 | 25.8 | 1.1 | 1.5 | 2.5 | 8.6 |
| Tensile elongation at break [%] | 810 | 830 | 820 | 800 | 1340 | 1280 | 186 | 550 |
| Wear registance | 37 | 38 | 35 | 29 | 190 | 178 | 60 | 159 |
| Specific gravity | 0.898 | 0.905 | 0.902 | 0.902 | 0.864 | 0.890 | 0.892 | 0.889 |
| Mar Registance Test 1 | 310 | 310 | 320 | 350 | 10 | 10 | 70 | 10 |
| Mar Registance Test 2 | 2 | 2 | 2 | 2 | 4 | 4 | 3 | 4 |

As apparent from the results shown in Tables 1 and 2, it is understood that the olefin thermoplastic elastomers or their compositions according to Examples 1 to 13 are excellent in all of scratch resistance, mechanical strength, rubber elasticity and wear resistance.

The sheet obtained by forming the pellets of the olefin thermoplastic elastomer composition obtained in Example 11 was very smooth in its surface, and foreign matter attributable to crosslinked gel that is called "gels" was not observed.

On the contrary, in Comparative Example 1, the copolymer was not crosslinked with any metal ions, and so it was low in mechanical strength, rubber elasticity, scratch resistance and wear resistance.

In Comparative Example 2, the olefin copolymer had no functional group, and so no crosslinked structure was formed even when the metal compound was added and the dynamic heat treatment was conducted, and the copolymer was low in mechanical strength, rubber elasticity, scratch resistance and wear resistance.

The olefin thermoplastic elastomer composition according to Comparative Example 3 was low in processability (flowability) and also in mechanical strength and scratch resistance.

The olefin thermoplastic elastomer composition according to Comparative Example 4 had the similar rubber elasticity (permanent set), flexibility (hardness) and mechanical strength as those of the olefin thermoplastic elastomer or its composition according to Examples 1 or 2, but was low in scratch resistance and wear resistance.

EFFECTS OF THE INVENTION

The olefin thermoplastic elastomers and their compositions according to the present invention have the same or similar rubber elasticity, flexibility and molding or forming and processability as those of the conventional olefin thermoplastic elastomers, and moreover are good in mechanical properties and wear resistance and excellent in scratch resistance in particular, and thus can be easily processed by melt molding or forming such as injection molding, extrusion, blow molding, compression molding, vacuum forming, laminate molding or calendering, whereby molded or formed thermoplastic elastomer products excellent in rubber elasticity, flexibility and mechanical properties can be provided.

The molded or formed products composed of the olefin thermoplastic elastomers and their compositions according to the present invention may also be used by bonding to or multi-layer laminating on ordinary molded or formed olefin vulcanized rubber products or molded or formed olefin thermoplastic elastomer products.

Since the olefin thermoplastic elastomers and their compositions according to the present invention have excellent rubber elasticity, flexibility, molding and processability and scratch resistance, they can be widely used as interior or exterior surface materials for automotive bumpers, sheathing chenille, window sealing gaskets, door sealing gaskets, gaskets for trunk room, roof side rails, emblems, inner panels, door trims and console boxes, weatherstrips and the like, leather sheets of which scratch resistance is required, sealing materials, interior or exterior surface materials and the like for aircrafts and marine vessels, sealing materials, interior or exterior surface materials, waterproofing sheet materials and the like for civil engineering and construction, sealing materials and the like for general machines and apparatus, packings, skins, housings and the like for light electric parts, rolls and cleaning blades for information instruments, films and sealing materials for electronic parts, protecting films for images such as photographs, decorative films for building materials, medical instrument parts, electric wires, daily needs and sports goods as the general processed products in which the conventional olefin thermoplastic elastomers are in use.

According to the production processes of the present invention, the above-described olefin thermoplastic elastomers and their compositions can be produced with advantage.

What is claimed is:

1. An olefin thermoplastic elastomer comprising an olefin random copolymer formed by copolymerizing ethylene, an α-olefin having 3 to 10 carbon atoms and an unsaturated monomer having a functional group, and optionally a non-conjugated diene, and metal ions crosslinking the olefin random copolymer.

2. The olefin thermoplastic elastomer according to claim 1, wherein the functional group in the unsaturated monomer having a functional group is a carboxyl group, hydroxyl group, epoxy group or sulfonic group.

3. The olefin thermoplastic elastomer according to claim 1, wherein the unsaturated monomer having a functional group is a functional cyclic compound represented by the following general formula (1):

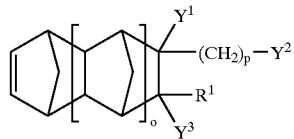

wherein $R^1$ represents a hydrogen atom or a hydrocarbon group having 1 to 10 carbon atoms, $Y^1$, $Y^2$ and $Y^3$ denote, independently of one another, a hydrogen atom, a hydrocarbon group having 1 to 10 carbon atoms or —COOH, with the proviso that at least one of $Y^1$, $Y^2$ and $Y^3$ is —COOH, and when at least two of $Y^1$, $Y^2$ and $Y^3$ are —COOH, they may be bonded to each other to form an acid anhydride (—CO—(O)—CO—), o is an integer of 0 to 2, and p is an integer of 0 to 5.

4. The olefin thermoplastic elastomer according to claim 3, wherein the olefin random copolymer is formed by copolymerizing 35 to 94.99 mol % of ethylene, 5 to 50 mol % of the α-olefin having 3 to 10 carbon atoms, 0.01 to 5 mol % of the functional cyclic compound represented by the general formula (1) and 0 to 10 mol % of the non-conjugated diene.

5. The olefin thermoplastic elastomer according to claim 1, wherein the metal ions are ions of a metal selected from the group consisting of potassium, sodium, aluminum, magnesium, barium, zinc, iron, calcium, titanium and lead.

6. The olefin thermoplastic elastomer according to claim 1, which has a melt flow rate of at least 0.5 g/10 min as measured under conditions of a temperature of 230° C. and a load of 10 kg, a permanent set of at most 30% and a durometer A hardness of at most 96.

7. A process for producing an olefin thermoplastic elastomer, comprising:

mixing a solution with 100 parts by weight of an olefin random copolymer formed by copolymerizing 35 to 94.99 mol % of ethylene, 5 to 50 mol % of an α-olefin having 3 to 10 carbon atoms, 0.01 to 5 mol % of a functional cyclic compound represented by the general formula (1) set forth in claim 3 and 0 to 10 mol % of a non-conjugated diene dissolved in a solvent with a liquid with 0.1 to 20 parts by weight of a metal compound dissolved or dispersed in a solvent, at a temperature of at least 20° C.; and removing the solvent(s), from the resultant liquid mixture.

8. A process for producing an olefin thermoplastic elastomer, comprising:

subjecting 100 parts by weight of an olefin random copolymer formed by copolymerizing 35 to 94.99 mol % of ethylene, 5 to 50 mol % of an α-olefin having 3 to 10 carbon atoms, 0.01 to 5 mol % of a functional cyclic compound represented by the general formula (1) set forth in claim 3 and 0 to 10 mol % of a non-conjugated diene and 0.1 to 20 parts by weight of a metal compound to a dynamic heat treatment under conditions of a temperature of 120 to 350° C. and a shear rate of 10 to 2,000 $s^{-1}$.

9. An olefin thermoplastic elastomer composition, comprising:

the olefin thermoplastic elastomer according to claim 1, and a polymeric compound selected from a thermoplastic resin and rubber and/or a softening agent, wherein the polymeric compound and the softening agent are contained in proportions of at most 300 parts by weight and at most 100 parts by weight, respectively, per 100 parts by weight of the olefin random copolymer forming the olefin thermoplastic elastomer.

10. The olefin thermoplastic elastomer composition according to claim 9, which has a melt flow rate of at least 0.5 g/10 min as measured under conditions of a temperature of 230° C. and a load of 10 kg, a permanent set of at most 30% and a durometer A hardness of at most 96.

11. A process for producing an olefin thermoplastic elastomer composition, comprising:

subjecting 100 parts by weight of an olefin random copolymer formed by copolymerizing 35 to 94.99 mol % of ethylene, 5 to 50 mol % of an α-olefin having 3 to 10 carbon atoms, 0.01 to 5 mol % of a functional cyclic compound represented by the general formula (1) set forth in claim 3 and 0 to 10 mol % of a non-conjugated diene, 0.1 to 20 parts by weight of a metal compound, and at most 300 parts by weight of a polymeric compound selected from a thermoplastic resin and rubber and/or at most 100 parts by weight of a softening agent to a dynamic heat treatment under conditions of a temperature of 120 to 350° C. and a shear rate of 10 to 2,000 $s^{-1}$.

12. A molded or formed product formed of the olefin thermoplastic elastomer according to claim 1 or the olefin thermoplastic elastomer composition according to claim 9.

* * * * *